US012069171B2

(12) United States Patent
Krummel et al.

(10) Patent No.: US 12,069,171 B2
(45) Date of Patent: Aug. 20, 2024

(54) HARDWARE SECURITY MODULE

(71) Applicant: Wincor Nixdorf International GmbH, Paderborn (DE)

(72) Inventors: Volker Krummel, Paderborn (DE); Peter Gunther, Bielefeld (DE)

(73) Assignee: Wincor Nixdorf International GmbH, Paderborn (DE)

( * ) Notice: Subject to any disclaimer, the term of this patent is extended or adjusted under 35 U.S.C. 154(b) by 419 days.

(21) Appl. No.: 17/291,088

(22) PCT Filed: Nov. 5, 2019

(86) PCT No.: PCT/EP2019/080232
§ 371 (c)(1),
(2) Date: May 4, 2021

(87) PCT Pub. No.: WO2020/094638
PCT Pub. Date: May 14, 2020

(65) Prior Publication Data
US 2021/0409210 A1    Dec. 30, 2021

(30) Foreign Application Priority Data

Nov. 5, 2018   (EP) .................................... 18204257

(51) Int. Cl.
*H04L 29/06*  (2006.01)
*H04L 9/08*   (2006.01)
(Continued)

(52) U.S. Cl.
CPC .......... *H04L 9/0877* (2013.01); *H04L 9/0897* (2013.01); *H04L 9/12* (2013.01);
(Continued)

(58) Field of Classification Search
CPC ..... H04L 9/083; H04L 9/0822; H04L 9/0825; H04L 9/0869; H04L 9/3247;
(Continued)

(56) References Cited

U.S. PATENT DOCUMENTS 7,853,667 B1 * 12/2010 Yoder .................... G06F 3/0649
                                                        709/217
10,652,327 B2 * 5/2020 Nidugala ............ H04L 41/0897
(Continued)

FOREIGN PATENT DOCUMENTS

CN     104346223 A  *  2/2015  ........... G06F 9/3016
CN     105094942 A  *  11/2015
(Continued)

OTHER PUBLICATIONS

Office Action filed in the corresponding Chinese application (written in the Chinese language) dated Nov. 2, 2022; 9 pages.
(Continued)

*Primary Examiner* — Sher A Khan
(74) *Attorney, Agent, or Firm* — Black McCuskey

(57) ABSTRACT

According to one exemplary embodiment, a hardware security module is described, having a receiver, which is configured to receive instructions for performing cryptographic operations, and a control device, which is configured to take an instruction load of the hardware security module as a basis for deciding whether one or more instructions should be relocated and, if one or more instructions should be relocated, to determine another hardware security module for relocating the one or more instructions, to authenticate the other hardware security module and to request the execution of the one or more instructions by the other hardware security module.

17 Claims, 4 Drawing Sheets

(51) Int. Cl.
*H04L 9/12* (2006.01)
*H04L 9/32* (2006.01)
*H04L 67/104* (2022.01)

(52) U.S. Cl.
CPC .......... *H04L 9/3236* (2013.01); *H04L 9/3247* (2013.01); *H04L 67/104* (2013.01)

(58) Field of Classification Search
CPC ............. H04L 9/3263; H04L 2463/062; H04L 63/0435; H04L 63/062; H04L 63/0823; H04L 9/0816; H04L 9/0819; H04L 9/0838; H04L 9/0877; H04L 9/0897; H04L 9/12; H04L 9/3236; H04L 67/104; H04L 9/3234; H04L 67/1008; G06F 21/78; G06F 21/57; G06F 21/602; G06F 21/71; G06F 21/33
See application file for complete search history.

(56) References Cited

U.S. PATENT DOCUMENTS

| | | | | |
|---|---|---|---|---|
| 2001/0042051 | A1* | 11/2001 | Barrett | G06Q 20/3823 705/65 |
| 2006/0133607 | A1* | 6/2006 | Forehand | H04L 9/0877 380/44 |
| 2006/0269061 | A1* | 11/2006 | Balasubramanian | H04L 63/0838 380/247 |
| 2007/0067369 | A1* | 3/2007 | Minshall | G06F 11/3495 |
| 2007/0198797 | A1* | 8/2007 | Kavuri | G06F 16/217 711/170 |
| 2008/0010325 | A1* | 1/2008 | Yamakawa | G06F 16/185 |
| 2009/0083538 | A1* | 3/2009 | Merugu | H04L 63/0281 713/153 |
| 2009/0169020 | A1* | 7/2009 | Sakthikumar | H04L 63/061 380/278 |
| 2009/0293136 | A1* | 11/2009 | Campbell | G08B 13/19 726/34 |
| 2010/0115080 | A1* | 5/2010 | Kageyama | H04L 61/2514 709/223 |
| 2012/0102185 | A1* | 4/2012 | Fernandes | A63F 13/358 709/224 |
| 2012/0124193 | A1* | 5/2012 | Ebrahim | H04L 43/0817 709/224 |
| 2015/0019478 | A1* | 1/2015 | Buehne | G06F 16/119 707/609 |
| 2015/0052254 | A1* | 2/2015 | Zhao | H04L 67/101 709/226 |
| 2015/0134953 | A1 | 4/2015 | Seaborn | |
| 2015/0358161 | A1 | 12/2015 | Kancharla | |
| 2017/0315838 | A1* | 11/2017 | Nidugala | H04L 43/0817 |
| 2018/0219955 | A1* | 8/2018 | Chen | H04L 41/0896 |
| 2019/0235903 | A1* | 8/2019 | Singh | G06F 9/45558 |

FOREIGN PATENT DOCUMENTS

| | | | | |
|---|---|---|---|---|
| CN | 105094942 | A | | 11/2015 |
| CN | 105528368 | A * | | 4/2016 |
| EP | 2437193 | A1 * | 4/2012 | ........... G06F 21/602 |
| EP | 3282362 | A1 * | 2/2018 | ........... G06F 11/14 |
| JP | 2004152062 | A * | 5/2004 | |
| JP | 2020016934 | A * | 1/2020 | ........... G06F 3/0604 |
| WO | WO-2018218349 | A1 * | 12/2018 | ........... G06F 15/00 |

OTHER PUBLICATIONS

Translation of the Office Action filed in the corresponding Chinese application dated Nov. 2, 2022; 14 pages.
International Search Report and Written Opinion filed in the corresponding European application dated Dec. 4, 2019; 13 pages.

* cited by examiner

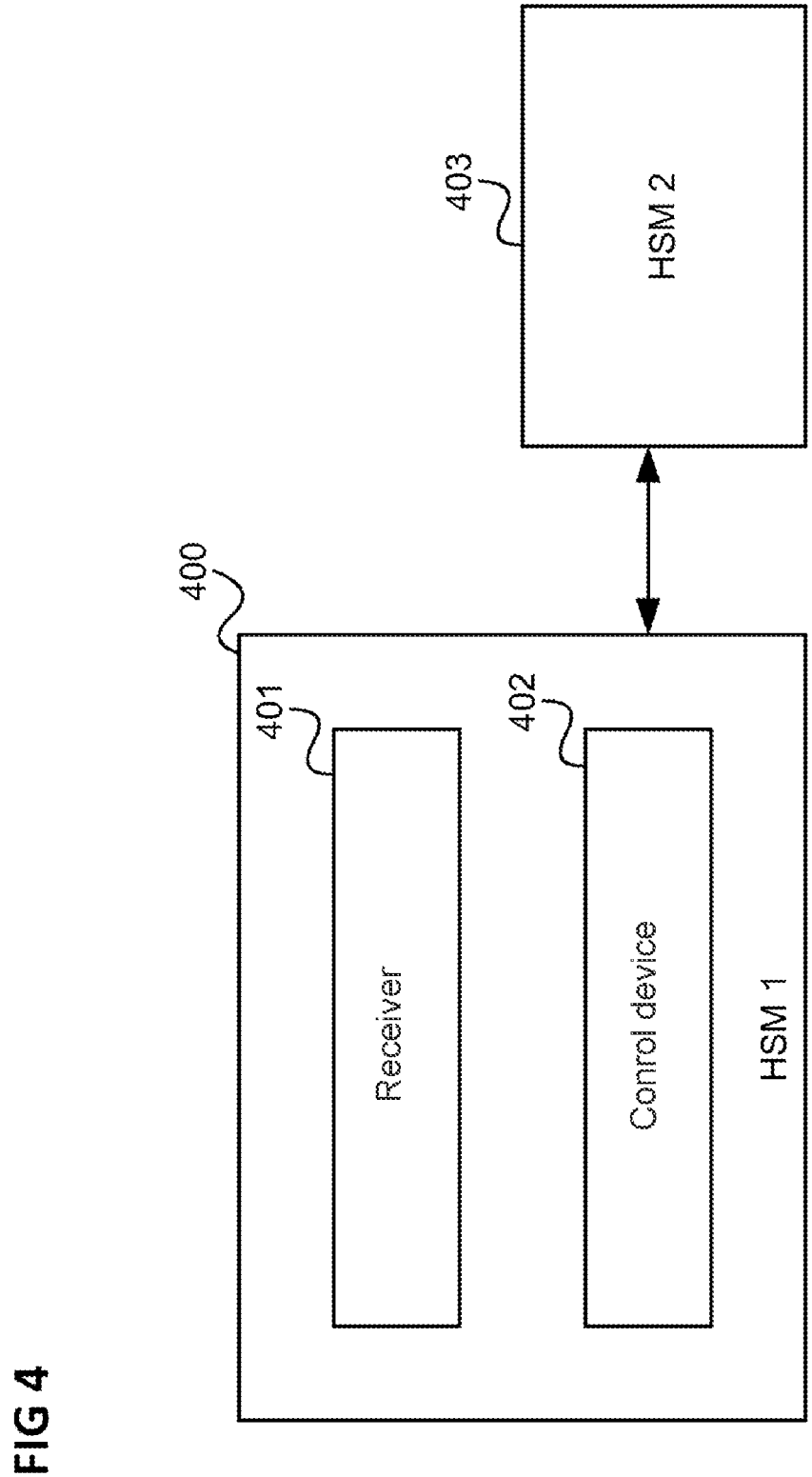

HARDWARE SECURITY MODULE

Embodiments relate in general to hardware security modules.

Security-relevant cryptographic operations can be relocated to specialized, secured hardware peripherals, so-called hardware security modules (HSMs). Depending on the application, a large number of cryptographic operations may be expected to be carried out by an HSM, which can lead to the HSM being overloaded, the instructions it receives being stored in a queue and the originator of the instruction, e.g. a computer system, having to wait for the processing of the instructions accordingly. Depending on the application, this can lead to unwanted delays. It is desirable to avoid the occurrence of such delays.

According to one embodiment, a hardware security module is described, including a receiver which is configured to receive instructions for performing cryptographic operations, and a control device, which is configured to take an instruction load of the hardware security module as a basis for deciding whether one or more instructions are to be relocated and, if one or more instructions are to be relocated, to determine another hardware security module for relocating the one or more instructions, to authenticate the other hardware security module and to request the processing of the one or more instructions by the other hardware security module.

The figures do not reflect the actual proportions, but are intended to illustrate the principles of the various embodiments. In the following text various embodiments are described with reference to the following figures.

FIG. 4 shows a hardware security module that can relocate one or more instructions to another hardware security module.

The following detailed description refers to the enclosed figures, which show details and embodiments. These embodiments are described in sufficient detail to enable the person skilled in the art to embody the invention. Other embodiments are also possible, and the embodiments can be modified in terms of their structural, logical and electrical aspects without deviating from the subject matter of the invention. The different embodiments are not necessarily mutually exclusive, but different embodiments can be combined to create new embodiments. For the purposes of this description, the terms "connected" and "coupled" are used to describe both a direct and an indirect connection, as well as a direct or indirect coupling.

In environments in which security-related transactions, such as the exchange of secret data or data that must not be falsified or altered, so-called hardware security modules (HSM) are usually used.

Figure 1:
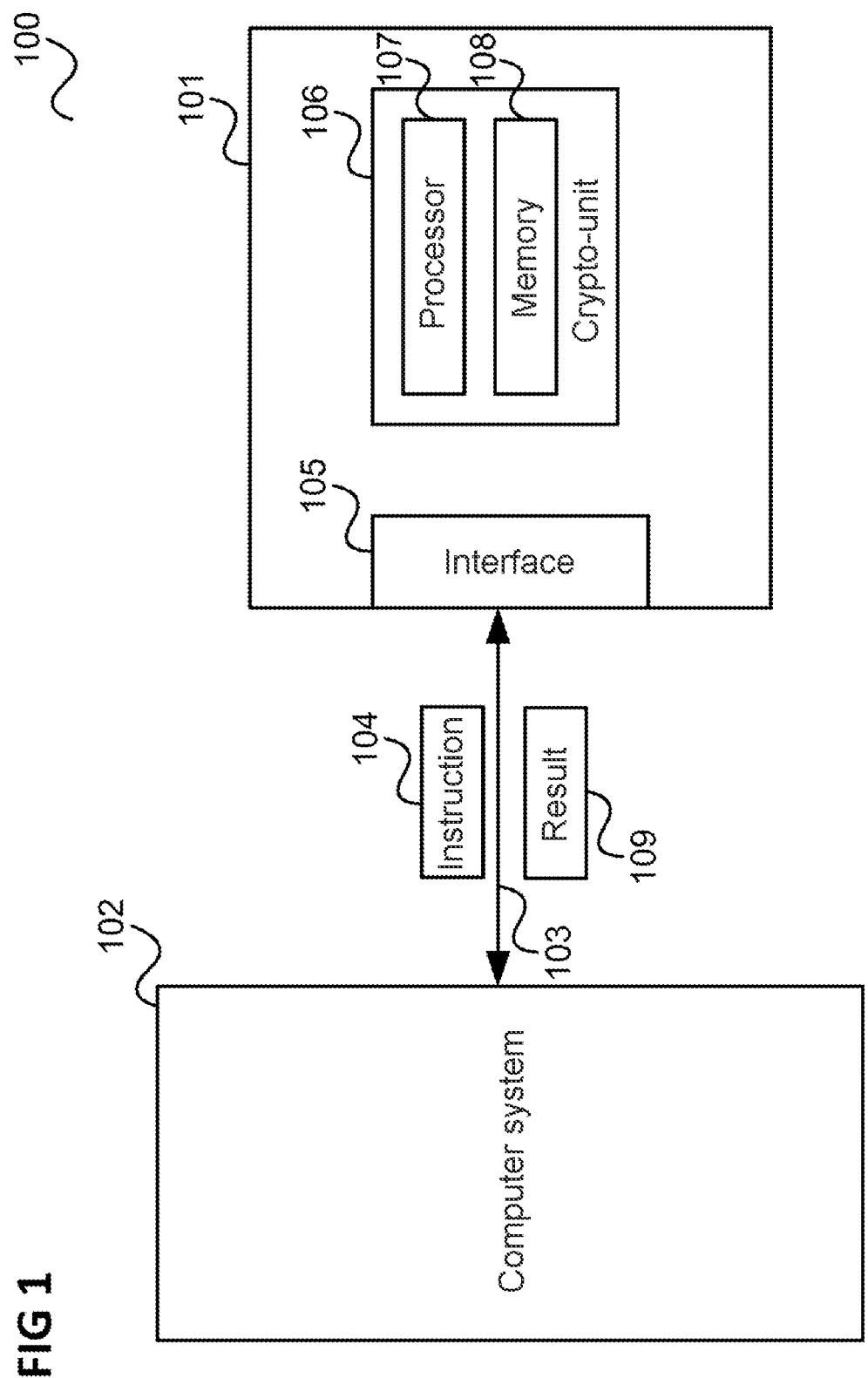
FIG. 1 shows a data processing arrangement with a hardware security module.

FIG. 1 shows a data processing arrangement 100 with a hardware security module (HSM) 101.

The hardware security module 101 is a peripheral device for a computer system 102 (for example, a server computer or a personal computer or a mobile computing device) to which it is connected via a communication link 103. The hardware security module 101 may be provided internal to the computer system 102 or may be an external device. The communication link 103 can be, for example, a computer bus or a connection via a computer network, as appropriate.

The function of the HSM 101 is to perform cryptographic operations in a secure environment. The computer system 102 can send an instruction 104 to the HSM 101 to perform a cryptographic operation via the communication link 103 in the form of a message, which instruction the HSM 101 receives via a communication interface 105 corresponding to the communication link 103 (i.e. which in this case operates as a receiver).

The HSM 101 processes the instruction 104. To this end, it includes a crypto-unit 106 with computing components, such as a processor (CPU) 107 and a memory 108 and possibly other computing components. After processing the instruction 104, the HSM 101 sends the result 108 of the processing 109 to the computer system 102 via its communication interface 105.

The HSM 101 can perform various cryptographic operations by implementing various cryptographic algorithms, such as
- asymmetric crypto-methods, for example RSA (encryption or signature), Diffie-Hellman key exchange, Elliptic Curve Cryptography (ECC), Elliptic Curve Digital Signature Algorithm (ECDSA)
- symmetric encryption and decryption: AES (Advanced Encryption Standard), DES (Data Encryption Standard), Triple-DES, IDEA (International Data Encryption Algorithm)
- cryptographic hash functions such as SHA-1 (Secure Hash Algorithm-1)
- generation of random numbers, keys and PINs (personal identification numbers; both physically and deterministically).

For example, the result 109 may contain encrypted or decrypted data, signed data, a hash value, a cryptographic key (or a key pair), a PIN, a random number, or more than one of these.

The security objectives when using an HSM 101 are typically the confidentiality and authenticity of the execution of a cryptographic operation. These security objectives are achieved by special hardware-based security mechanisms for the HSM 101, such as sensors and chip shields (e.g. against physical attacks on a chip from the rear of the chip). Hardware protection for other components, such as the computer system 102, can then be omitted. The achievement of the security objectives is thus typically ensured exclusively using cryptographic protocols and mechanisms, the security anchor of which is located in the crypto-unit.

In particular, the HSM 101 may include comprehensive functions for the secure management of the HSM 101 and the data that it stores, such as cryptographic keys. Examples of these are authentication of operators and administrators by means of hardware tokens (e.g. using a chip card or a security token), access protection in the multiple-signature principle (e.g. k from n persons are required for access), encrypted backup of the data (such as keys and configuration data) and secure cloning of the HSM 101.

HSMs are often designed as single servers with fixed functionality, fixed configurations and fixed computing power. Changes to the configuration typically require complex manual processes to prevent tampering with the corresponding device. Changes to the functionality typically involve a firmware upgrade, which is also carried out by manual processes. The performance of such an HSM is fixed over its entire lifetime and any necessary performance increases can only be achieved by integrating other HSMs of the same type, the management and load distribution of which must be carried out via the infrastructure.

According to various embodiments, an HSM is therefore provided which offers the facility to dynamically intercept overloads (due to a large number of instructions or single complex instructions) by adding additional free HSMs. After processing the overload, the additional HSMs are released again.

Figure 2:
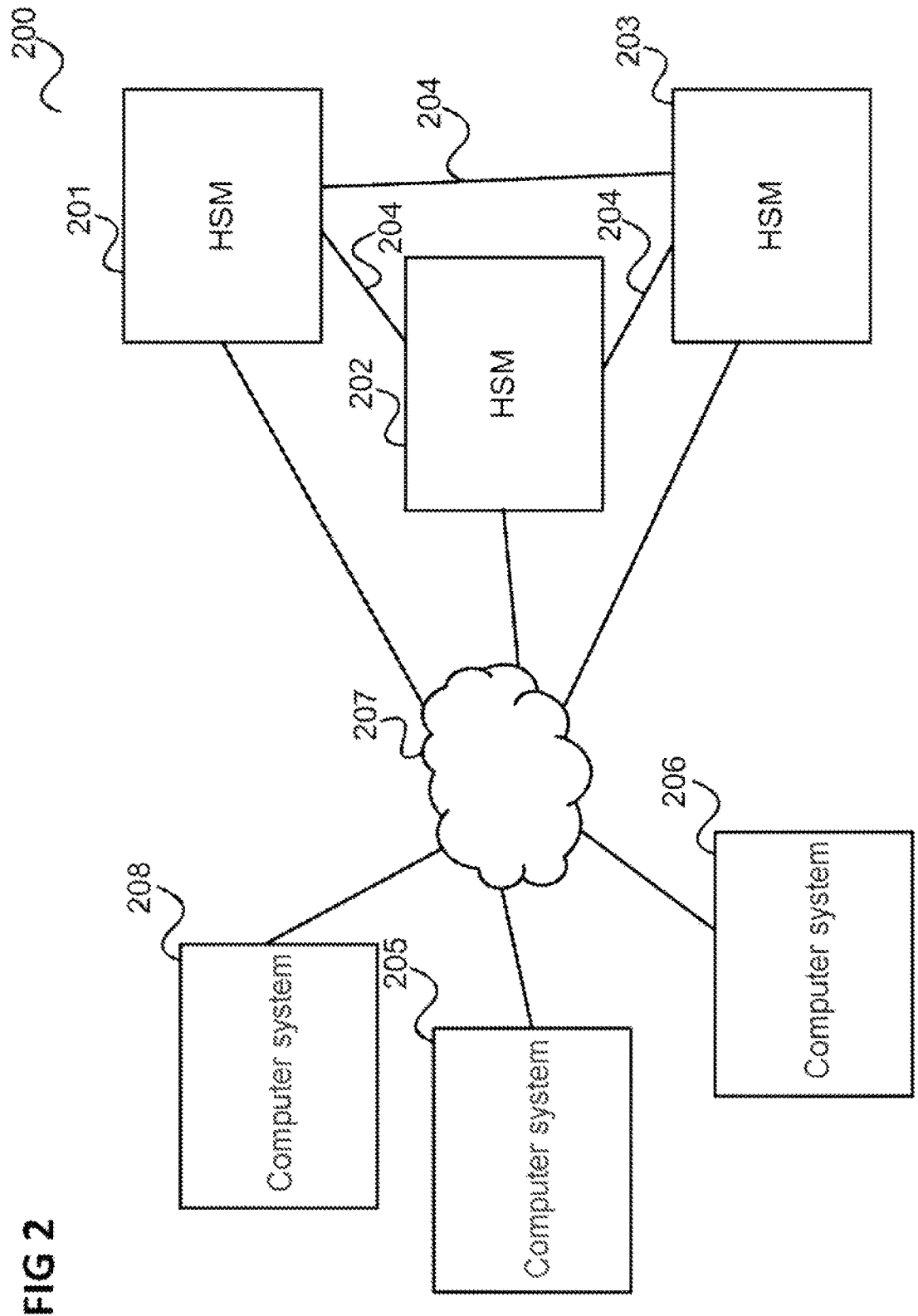
FIG. 2 shows a data processing arrangement with a plurality of hardware security modules.

FIG. 2 shows a data processing arrangement 200 with a plurality of hardware security modules (HSMs) 201, 202, 203.

In this example, three HSMs 201, 202, 203 are provided, but it is also possible to provide only two or a larger number of HSMs.

The HSMs 201, 202, 203 are connected to one another via communication link 204, for example, either completely or only partially or according to other topologies such as a ring topology.

In this example, the HSMs 201, 202, 203 are connected to a plurality of computer systems 208, 205, 206 via a computer network 207, for example. However, they can also be provided at least in part in the computer systems 208, 205, 206 and be connected to one another via communication links between the computer systems 208, 205, 206. The communication links between the HSMs 201, 202, 203 themselves and between the HSMs 201, 202, 203 and the computer systems 208, 205, 206 are, for example, computer buses or network connections as appropriate.

For example, each HSM 201, 202, 203 has the functions and mechanisms described above for the HSM 101. In particular, each HSM 201, 202, 203 provides a secure environment for performing cryptographic operations. For this purpose, each HSM 201, 202, 203 provides hardware protection for the execution of cryptographic algorithms, for example, using secret cryptographic keys.

According to various embodiments, each HSM 201, 202, 203 can be used by different computer systems 208, 205, 206, i.e. receive and process instructions from different (for example, all) computer systems 208, 205, 206. For example, the different computer systems 208, 205, 206 correspond to different clients and each HSM 201, 202, 203 can be used by different clients. This is also referred to as multi-client capability (or multitenancy). In this system a client (or a computer system 208, 205, 206) can engage an HSM 201, 202, 203 and release it again at any time. After it is released, another client can use the HSM.

According to one embodiment, scalability of the HSMs 201, 202, 203 is supported. This means that each HSM 201, 202, 203 can reconfigure one or more additional HSMs 201, 202, 203 as required during operation and use them to support the processing of current instructions. This enables an automated parallelization of complex instructions.

Communication between the HSMs 201, 202, 203 can be based on a secured peer-to-peer approach that does not require a central server or higher-level software layer. For example, the communication is particularly secure and the encryption security can also be scalable. The communication can also be divided into different, independent sessions (according to a secret-sharing principle). In this case, an attacker who wants to obtain information about the communication would have to successfully attack each of these sessions.

Secure communication is provided between the requester (i.e. a computer system 208, 205, 206 that sends an instruction) and an HSM 201, 202, 203. For example, communication to and from the HSM 201, 202, 203 is implemented via a secure communication channel. This may include a user concept, access control and transaction authentication.

According to one embodiment each HSM 201, 202, 203 has a secure queue for inbound instructions. The queue is secured against potential attacks. In addition to confidentiality, this also guarantees authenticity, completeness and correct processing of the instructions in the correct order (e.g. according to their receipt). Secure internal routing can also be provided in the HSMs.

In the event of an overload, each HSM 201, 202, 203 can apply a load distribution to one or more other HSMs 201, 202, 203, i.e. relocate one or more instructions to one or more other HSMs 201, 202, 203. The HSM 201, 202, 203 can redirect a pending load (e.g. instructions in its queue) to other HSMs 201, 202, 203 that are already available and appropriately configured. This ensures confidentiality, authenticity and completeness.

As described in relation to FIG. 1, each HSM 201, 202, 203 is a device that is protected against logical and physical attacks (in particular also side-channel attacks) by means of hardware-based security measures. In particular, the HSMs 201, 202, 203 can be separate devices, implemented and secured by respective (separate) hardware. For example, if an HSM 201, 202, 203 detects an attack that breaches one of the security measures (e.g. by means of an appropriate sensor), such as the forced opening of the housing of the HSM 201, 202, 203, then it may be provided that the HSM 201, 202, 203 completely deletes all security-relevant information stored in it, such as cryptographic keys.

With regard to the key management implemented by the HSMs, for example, each HSM 201, 202, 203 can import (cryptographic) keys to be used and store them internally in a secure area. It can check each key for authenticity and integrity. For each key, it can also store metadata that specifies e.g. the cryptographic algorithm to be used for the key, the purpose of the key, etc. If such metadata is present, the HSM 201, 202, 203 in this case checks the authorized use of the key against this metadata before each use of the key.

Different crypto-hardware can be integrated into each HSM 201, 202, 203. For example, special hardware and/or one or more coprocessors can be used in the crypto-unit 106 to provide efficient and secure processing. The crypto-unit 106 can be optimized for the respective crypto-algorithms to be used and, for example, only implement the necessary methods, i.e. it does not provide support for unused methods.

The HSMs 201, 202, 203 can support their status being checked by an external service (e.g. at any time), for example by one of the computer systems 201, 202, 203 (a process known as remote attestation). This check is cryptographically protected, for example by a challenge-response protocol.

The HSMs 201, 202, 203 can support key revocation. For example, HSM 201, 202, 203 checks for an expiration date in the metadata of a key and discards the key if it has expired. This can also be carried by means of a signature that has a time-limited validity. An entire set of keys used by the HSM 201, 202, 203 can also be signed for a limited time. Then the validity of individual keys of the set depends on the validity of the signature. For example, the key(s) may need to be re-signed from time to time to remain validly signed. If the validity of the signature has expired, i.e. a corresponding date has been exceeded, the HSM 201, 202, 203 refuses to use the key or keys. Since a key can only be used within a single HSM 201, 202, 203, such a revocation is possible.

The HSMs 201, 202, 203 can also be implemented in a common device as an alternative to the use of separate hardware. For example, a computer system implements a plurality of HSMs 201, 202, 203. In this case, the HSMs 201, 202, 203 can be regarded as virtual HSMs 201, 202, 203 of an HSM service provided by the computer system, or as multiple HSM instances. For example, components (such as the crypto-unit 106) of the HSMs 201, 202, 203 are implemented by a common processor. Nevertheless, the computer system has hardware protection measures, i.e. hardware-protected processing environments, to implement the HSMs 201, 202, 203 and the domains of the individual HSMs 201, 202, 203 are protected from one another, as in the case of separate hardware, for example in such a way that secret data does not leave the domain of an HSM 201, 202, 203 in plain text.

According to one embodiment, the HSMs 201, 202, 203 enable a flexible external control. Input to an HSM 201, 202, 203 is an instruction 104 (for example, for a transaction to be secured between users) with all its parameters necessary for processing. The exact specification can be chosen regardless of the design of the HSMs 201, 202, 203. The output of the HSM 201, 202, 203 is the result of processing the instruction and can also contain the status that indicates whether the instruction was successfully processed or whether an error occurred. In one embodiment, for security reasons, the exact error details are not sent via the interface 105 together with the result 109, but can be queried via a monitoring service or logging service. For security reasons, the status can be protected against unauthorized reading.

The following describes an example of the architecture of an HSM 201, 202, 203.

Figure 3:
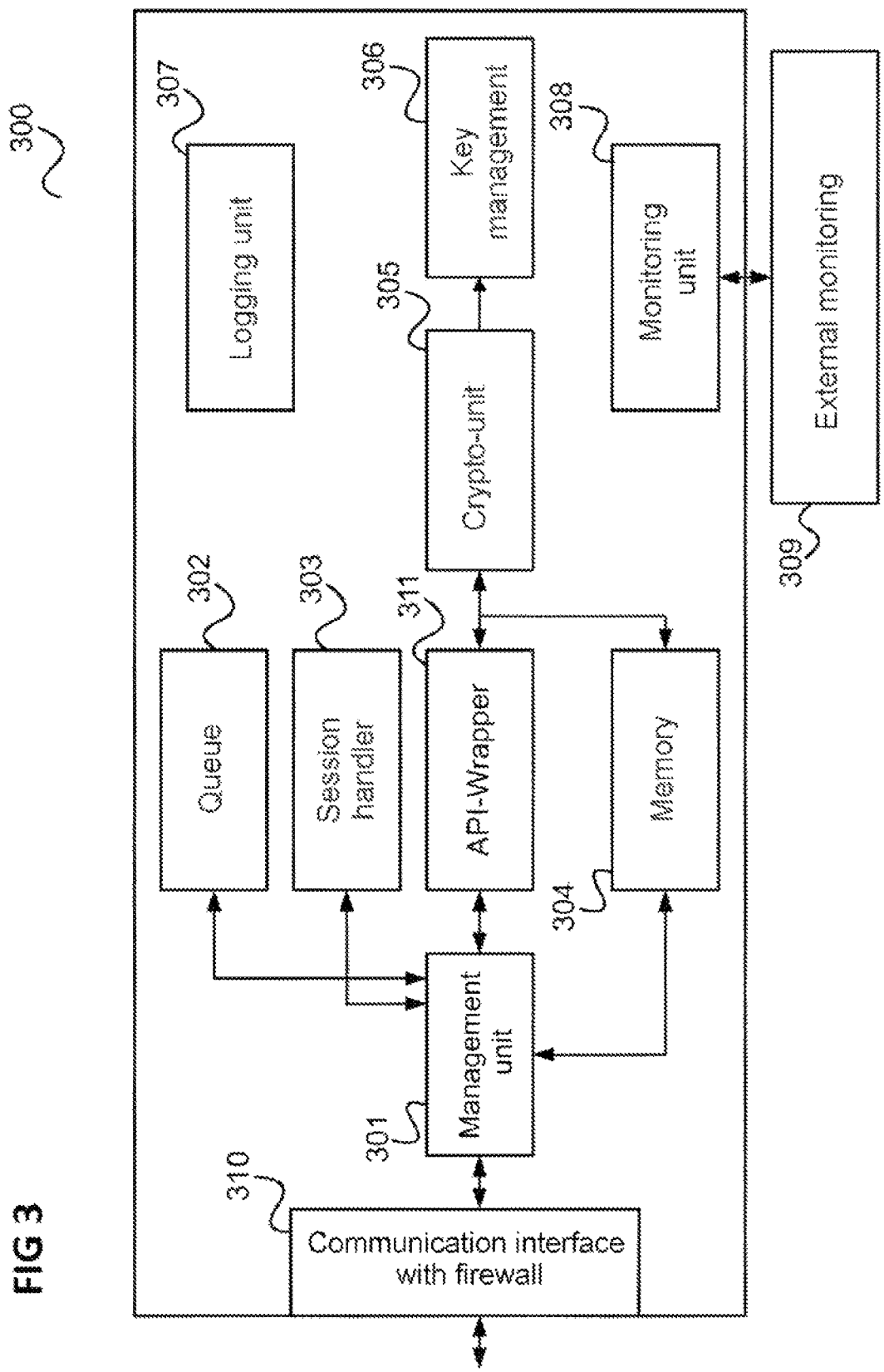
FIG. 3 shows a hardware security module in greater detail, which corresponds, for example, to one of the hardware security modules of FIG. 2.

FIG. 3 shows an HSM 300.

The HSM 300 includes a management unit 301 which contains the control logic of the entire system (i.e. the entire HSM 300). It controls, among other things, the entire communication within the HSM 300, but also with the outside world, i.e. external devices such as other HSMs 201, 202, 203 and computer systems 208, 205, 206.

To buffer incoming instructions, the HSM 300 has a queue 302. This is where incoming instructions (e.g. for transactions) are stored after detailed checking. Depending on the characteristics of the system, a first-in first-out (FIFO) queue, a randomized queue, or a priority list queue can be used.

A session management unit (Session Handler) 303 of the HSM 300 opens a session to process an instruction. A session can provide confidential and authenticated bi-directional communication, such as with another HSM. Different sessions are independent of one another, so that if a session is compromised, it will not affect other sessions.

The HSM 300 also contains a memory 304 for parameters. Each HSM 201, 202, 203 contains a set of parameters. These include functional parameters: the functional parameters include all parameters necessary for reliable communication with the HSM. For example, these include values such as the IP address of the HSM, an indication of the communication protocol used, etc. These parameters are not necessarily relevant to security.

Parameters for administration: certain functionalities and means of access to the HSM are required for administration. These include, for example, the credentials of the HSM administrators. These parameters are security-relevant and are protected accordingly.

Parameters for defining the interface: the HSM can be configured to offer specific services, to offer limited services, or to offer none at all. This configuration can be carried out statically, i.e. by a fixed set of rules. However, the configuration can also be carried out dynamically, e.g. depending on the current session.

Key for internal protection: an HSM uses secret data, such as key material and attribute certificates, for authentication against other HSMs, for example. These types of data are generated securely, inserted securely into the HSM and stored securely there. Access to this data is carried out exclusively by HSM-internal protocols. These parameters are security-relevant and are protected accordingly.

User keys: depending on the deployment scenario, the HSM uses user keys. Regardless of the specific encryption procedures used, the confidentiality of the private keys and the authenticity of all keys are ensured.

The core of the HSM 300 is a crypto-unit 305. The crypto-unit 305 performs the various encryption procedures. In order to protect sensitive data such as keys, the crypto-unit 305 is protected by hardware-based protective measures. In addition to physical security, this ensures the correct, high-performance implementation and execution of the encryption procedures. The entire contents of the crypto-unit 305 (i.e. data stored therein for processing) is security-relevant and protected by appropriate hardware-based protective measures.

An application programming interface (API) wrapper 311 for the HSM can convert the defined user transactions into hardware-specific commands. This makes it possible to use different crypto-units for operation.

The HSM 300 also has a key management unit 306 which stores and manages the keys to be used for the specific functionalities (in particular the cryptographic procedures performed). In addition to the reliable storage of the keys, it also supports functions such as the updating of keys, e.g. the exchange of keys on a regular basis or in response to a corresponding trigger, revocation, declaration of a key as invalid, and secure deletion, in which a key is irretrievably deleted.

A logging unit 307 logs the operations performed in the HSM 300. The log does not contain any confidential data such as keys. The completeness and authenticity of the entries in the log are secured. Provision can be made for exporting the log for external analysis and storage, for example, by access via a logging service.

A monitoring unit 308 monitors the condition of the remaining components of the HSM 300. For example, it checks the authenticity and completeness of the logs of the logging unit 307, the status of the crypto-unit 305, and the queue 302. In the event of critical states such as compromising of the crypto-unit 305, it sends messages to configurable receivers (e.g. via the network, mobile networks, telephone networks or satellite) for external monitoring 309. Devices for external monitoring 309 can also use the monitoring unit to request information about the status of the HSM 300 from outside.

For communication with other devices, e.g. other HSMs 201, 202, 203 and computer systems 208, 205, 206, the HSM 300 has a communication interface 310. The communication interface 310 is equipped with a firewall that regulates the communication of the HSM 300 with the other devices. This provides a defense against, for example, network-based attacks such as denial of service (DOS) attacks.

The various functional units of the HSM 300 such as the management unit 301, session handler 303, API wrapper 311, key management unit 306, logging unit 307, monitoring unit 308 and communication interface 310 can be implemented by one or more programmed processors and, if necessary, corresponding memories (and accordingly treated as logical components) or else by hardwired circuits.

The management unit 301 decides on the relocation of instructions to another HSM, for example. For example, it checks the status of the queue and decides that an instruction should be relocated if the fill level of the queue is above a specified threshold value. For example, the management unit 301 can access the memory 304 to find out which other HSMs are available and how they can be reached. For example, corresponding information (such as IP or TCP addresses of other HSMs) is stored in the memory 304.

The HSM 300 uses different objects, such as one or more
- Session objects: a session object is created for each session and contains the following data
  - Session ID: unique identifier of the session. However, the uniqueness is not a security feature.
  - Session key: unique, confidential key for the session. This key can be used, for example, to derive working keys for the various protection objectives.
- Certificates, such as the root certificate HSM-AUTH-ROOT-ZERT, for verifying the authentication certificate chain, for example, for mutual authentication of HSMs.
- Cryptographic keys, such as a confidential key HSM-AUTH-KEY, for proving the authenticity of the HSM 300.
- DH (Diffie-Hellmann) parameters, e.g.
  - DH generator: generator of the DH group
  - DH group parameters: parameters of the DH group (e.g. module, EC (elliptic curve), . . . )

The following text describes the processes and protocols used for the components of the HSM 300. In addition to the required functionalities, this also includes specific measures to achieve protection objectives such as confidentiality, integrity, authenticity, availability, and liability/non-repudiation.

A user sends an instruction 104 to the HSM 300 for processing using a computer system 102. In addition to the description of the command, an instruction contains all the necessary parameters and data.

The queue 302 is responsible for managing incoming instructions. According to one embodiment, a FIFO approach is implemented. Alternatively, an optimization strategy can be implemented that operates on independent instructions. According to one embodiment, the queue is not stored and processed in the secure hardware area of the HSM 300. However, the above protection objectives are ensured by appropriate cryptographic measures.

An operation to add the instruction to the queue 302 (enqueue operation) accepts a new instruction into the queue 302. For security reasons, the above security objectives are pursued with, for example, the following corresponding measures:
- Confidentiality, i.e. no information about the contents of instructions may be obtained by analysis of the active queue. For this purpose, each instruction is stored in the queue in encrypted form and every response (e.g. the result 109) is transmitted to the sender in encrypted form.
- Authenticity, i.e. only instructions from authenticated sources are allowed to be accepted. To achieve this, only authenticated instructions are accepted. In addition, an authenticated (i.e. signed) confirmation of the acceptance of the instruction 104 is sent to the instruction source (computer system 102) and the response 109 is authenticated against the instruction source.
- Availability, i.e. the queue 302 must not jeopardize the availability of the service provided by the HSM 300 as a "Single Point of Failure", e.g. due to failure or overload. For this purpose, the queue can be stored redundantly (e.g. by replication across multiple peers, e.g. multiple HSMs).
- Liability/non-repudiation. For this purpose, an authenticated (signed) confirmation of the acceptance of an instruction is sent to the instruction source. In addition, the logging unit 307 creates an authenticated entry in an instruction log.

An operation to remove an instruction from the queue 302 (dequeue operation) sends an instruction for processing to the secure hardware of the HSM 300 and removes the entry from the queue 302. Further mechanisms for confidentiality, integrity and authenticity then become unnecessary. For availability, the queue 302 can be stored redundantly (e.g. by replication across multiple peers, e.g. HSMs). The dequeue operation is replicated across the redundant instances. For liability/non-repudiation, the logging unit 307 registers the execution of the instruction in a log (e.g. a log file). This includes, for example, the originator, the time of acceptance into the queue, the time of the removal from the queue, and information about the concatenation of the process, e.g. information about the connection with other operations performed (e.g. cross-references).

For load distribution to another HSM 201, 202, 203, the HSM 300 searches for another HSM 201, 202, 203 and first verifies that the other HSM 201, 202, 203 is a valid HSM. For this purpose, the HSM, referred to in the following as the verifying HSM, and the other HSM, referred to as the destination HSM, use an HSM verification operation (e.g. referred to as "Verify SFC-HSM"). This operation verifies that the destination HSM is a valid HSM. In doing so, no information is disclosed as to who currently "owns" the destination HSM (ownership), i.e. which client or which computer system 208, 205, 206 is currently occupying the destination HSM.

It is assumed that the destination HSM is equipped with the (confidential) HSM-AUTH-KEY as described above. The destination HSM also has the corresponding certificate HSM-AUTH-ZERT, which certifies the authenticity of the key HSM-AUTH-KEY. The certification is part of a certificate chain which ends in the global HSM-AUTH-ROOT-ZERT. The verifying HSM possesses the certificate HSM-AUTH-ROOT-ZERT.

The verifying HSM is not convinced (i.e. does not successfully verify) that the destination HSM is a valid HSM if the HSM verification operation fails. The verifying HSM is convinced (i.e. verifies successfully) that the destination HSM is a valid HSM if the HSM verification operation was successful and a session object was created as a result. The session object allows the establishment of a secure communication session between the verifying HSM and the destination HSM.

The input for the HSM verification operation is the address of the destination HSM (e.g. the TCP address). The output of the HSM verification operation is "Error" if the verification fails. If the verification is successful, a session object is returned.

For security reasons, the above security objectives are pursued, for example, with the following corresponding measures:
- Confidentiality: it is intended that no information relating to confidential key material, settings of an HSM, or the ownership of the HSM can be viewed by outsiders. This is achieved, for example, by the following measures:

- The synchronization protocol used between the verifying HSM and the destination HSM for verification uses suitable encryption measures.
- The keys used for this are based on a pre-personalized key set.
- The synchronization protocol is direction-specific and session-based and has the forward-secrecy property.

Authenticity: the authenticity of the data of all messages exchanged between the verifying HSM and the destination HSM for verification is ensured by signatures (or alternatively, MACs (message authentication codes)). The authenticity is checked for each message immediately after receipt. If the check fails, the HSM verification operation is aborted (with error message).

Availability: Not applicable. Availability of the received instructions can be achieved by redundantly storing the queue 302.

Liability/non-repudiation. For this purpose, an authenticated (signed) confirmation of the acceptance of an instruction is sent to the instruction source. In addition, the logging unit 307 creates an authenticated (signed) entry in an instruction log.

Table 1 shows an example of the sequence of an HSM verification operation in pseudo-code. V denotes the verifying HSM and P (for Proofer) denotes the destination HSM. If only the source is specified but not the destination, this indicates an operation performed in the source, otherwise it indicates the transmission of a message in the direction indicated by the "→" arrow. The arrow "←" designates the formation of the message to the left of the arrow with the content to the right of the arrow.

TABLE 1

|  | Source |  | Destination | Transmitted message or operation performed |
|---|---|---|---|---|
| (1) | V | → | P | StartVerAuth (includes Challenge c) |
| (2) | P |  |  | M←HSM-AUTH-ZERT,c |
| (3) | P | → | V | S←SIG[HSM-AUTH-KEY]{M} |
| (4) | V |  |  | Verify S |
| (5) | V |  |  | Verify c |
| (6) | V |  |  | Verify HSM-AUTH-ZERT |
| (7) | V |  |  | M←DH key exchange message 1 |
| (8) | V | → | P | S←SIG[HSM-AUTH-KEY]{M} |
| (9) | P |  |  | M←DH key exchange message 2 |
| (10) | P | → | V | S←SIG[HSM-AUTH-KEY]{M} |

In (2), HSM-AUTH-ZERT stands for HSM-AUTH-ZERT and all other certificates of the certificate chain. Steps (7) to (9) for the DH key exchange are carried out if the verifications of (4) to (6) were successful.

According to one embodiment, an operation is additionally provided for load distribution, by means of which the verifying HSM verifies that a destination HSM is a valid HSM and that it is in possession of a specific client or computer system 208, 205, 206 (ownership), i.e. it is currently occupied by a specific client or computer system. This operation is called "Verify Client HSM", for example.

In addition, an operation called "isFree"-operation can be provided, by means of which an HSM can determine whether a destination HSM is free (i.e. not currently occupied).

For the "Verify Client HSM" operation, it is assumed that the destination HSM is equipped with the (confidential) key HSM-AUTH-KEY. The destination HSM also has the corresponding certificate HSM-AUTH-ZERT, which certifies the authenticity of the key HSM-AUTH-KEY. The certification is part of a certificate chain which ends in the global HSM-AUTH-ROOT-ZERT. The verifying HSM possesses the certificate HSM-AUTH-ROOT-ZERT.

The ownership which the verifying HSM checks for is, for example, whether the destination HSM is owned by the same client as the verifying HSM itself.

If the destination HSM has been taken into ownership by a specific client, the destination HSM will have a configuration dataset that includes all individual settings and keys (for the client). Each HSM implements an algorithm that generates a cryptographic checksum over the configuration dataset. The checksum is unique, collision-resistant and does not allow inferences to be drawn about the contents of the configuration.

If the verifying HSM retrieves a corresponding checksum from the destination HSM to verify that the destination HSM is occupied by a specific client, for example, nonces are provided for this on both sides as follows: on the verifying HSM side to prevent replay attacks and on the destination HSM side to ensure confidentiality. Comparisons of different algorithm outputs should not allow any inference to be drawn, for example, on similarity or dissimilarity.

The verifying HSM is not convinced that the destination HSM is a valid HSM under the given ownership if the client HSM verification operation fails. The verifying HSM is convinced that the destination HSM is a valid HSM under the given ownership if the HSM verification operation was successful and a session object was generated as a result. The session object allows the establishment of a secure communication session between the verifying HSM and the destination HSM.

The input for the client HSM verification operation is the address of the destination HSM (e.g. the IP address). The output of the client HSM verification operation is "Error" if the verification fails. If the verification is successful, a session object is returned.

For security reasons, the above security objectives are pursued with, for example, the following corresponding measures:

Confidentiality: it is intended that no information relating to confidential key material, settings of an HSM, or the ownership of the HSM can be viewed by outsiders. This is achieved, for example, by the following measures:

- The synchronization protocol used between the verifying HSM and the destination HSM for verification uses suitable encryption measures.
- The keys used for this are based on a pre-personalized key set.
- The synchronization protocol is direction-specific and session-based and has the forward-secrecy property.
- The checksum is randomized so that no inferences can be drawn about changes to the configuration based on protocol recordings. This means that both parties (verifying HSM and destination HSM) introduce random values into the protocol sequence, which prevent information about the internal state of the destination HSM from being derived from protocol recordings.

Authenticity: the authenticity of the data of all messages exchanged between the verifying HSM and the destination HSM for verification is ensured by signatures (or alternatively, MACs (message authentication codes)). The authenticity is checked for each message immediately after receipt. If the check fails, the HSM verification operation (with error message) is aborted.

Availability: Not applicable. Availability of the received instructions can be achieved by redundantly storing the queue 302 (e.g. by means of replication across multiple peers, i.e. HSMs).

Liability/non-repudiation. For this purpose, an authenticated (signed) confirmation of the acceptance of an instruction is sent to the instruction source. In addition, the logging unit 307 creates an authenticated entry in an instruction log.

Table 2 shows an example of the sequence of a client HSM verification operation in pseudo-code. As in Table 1, V denotes the verifying HSM and P the destination HSM. If only the source is specified but not the destination, it is an operation performed in the source, otherwise it involves the transmission of a message in the direction indicated by the "→" arrow. The arrow "←" designates the formation of the message to the left of the arrow with the content to the right of the arrow.

TABLE 2

| | Source | | Destination | Transmitted message or operation performed |
|---|---|---|---|---|
| (1) | V | → | P | StartVerAuth (includes Challenge c) |
| (2) | P | | | M←HSM-AUTH-ZERT,c |
| (3) | P | → | V | S←SIG[HSM-AUTH-KEY]{M} |
| (4) | V | | | Verify S |
| (5) | V | | | Verify c |
| (6) | V | | | Verify HSM-AUTH-ZERT |
| (7) | V | | | M←DH key exchange message 1 |
| (8) | V | → | P | S←SIG[HSM-AUTH-KEY] {M} |
| (9) | P | | | M←DHkey exchange message 2 |
| (10) | P | → | V | S←SIG[HSM-AUTH-KEY]{M} |

In (2), HSM-AUTH-ZERT stands for HSM-AUTH-ZERT and all other certificates of the certificate chain. Steps (7) to (9) for the DH key exchange are carried out if the verifications from (4) to (6) were successful.

In order to reallocate an instruction from one HSM (hereafter referred to as source HSM) to another HSM (hereafter destination HSM), the source HSM (specific item of hardware) which can be appropriately personalized for processing instructions for a specific client (or computer system 208, 205, 206), can be cloned to the destination HSM, for example, for performance reasons. In this case all client-specific data, settings and keys are sent from the secure area of the source HSM to the secure area of the destination HSM. It should be noted that sensitive key material must be exported from the hardware (this may be relevant to certification). The destination HSM is equivalent to the source HSM after successful execution of this operation.

The cloning operation starts the cloning process, which includes the following, for example:
1. Finding a potential destination HSM
2. Synchronizing the settings and keys
3. Verification of the synchronization For security reasons, the above security objectives are pursued with, for example, the following corresponding measures:

Confidentiality: it is intended that no information relating to confidential key material, settings of an HSM, or the ownership of the HSM can be viewed by outsiders. This is achieved, for example, by the following measures:

The synchronization protocol used between the source HSM and the destination HSM uses suitable encryption measures.

The keys used for this are based on a pre-personalized key set.

The synchronization protocol is direction-specific and session-based and has the forward-secrecy property.

Authenticity:

The destination HSM accepts only one configuration from an authenticated source HSM The destination HSM sends an authenticated (i.e. signed) confirmation.

The source HSM authenticates (i.e. verifies) each response from the destination HSM.

When a user or computer system 208, 205, 206 sends an instruction to an HSM 300 (e.g. for a transaction), the HSM 300 may carry out a load distribution to one or more other HSMs depending on its load or the complexity of the instruction. To this end, the HSM 300 can verify the other HSMs by means of the above verification operations (i.e. verify their authenticity) and transfer its configuration to the other HSMs by means of the above-described cloning operation.

All activities are logged by the logging unit 307. The HSM can check the authenticity and completeness of the log (e.g. periodically). In addition, the HSM can perform (e.g. periodically) a status check of the management unit 301 and the queue 302.

In summary, according to various embodiments a hardware security module as shown in FIG. 4 is provided.

FIG. 4 shows a hardware security module 400.

The hardware security module 400 includes a receiver 401 which is configured for receiving instructions to perform cryptographic operations.

The hardware security module 400 also includes a control device 402 which is configured to take an instruction load of the hardware security module 400 as a basis for deciding whether one or more instructions should be relocated.

Control device 402 is also configured, if one or more instructions are to be relocated, to determine another hardware security module 403 for relocating the one or more instructions, to authenticate the other hardware security module 403 and to request the processing of the one or more instructions by the other hardware security module 402.

According to various embodiments, to avoid delays in processing an instruction for a cryptographic operation by a hardware security module (HSM), a load distribution between multiple HSMs is provided. To this end, the source HSM that received the instruction selects a destination HSM, authenticates it and requests it to process the instruction. Using the authentication, the source HSM ensures that the destination HSM is an authentic HSM, such as a properly protected device, and not a device that belongs to an attacker pretending to be an HSM.

Load distribution among multiple HSMs effectively provides users with an HSM service instead of individual HSMs, or in other words, a cloud consisting of individual cloud-enabled HSMs.

For example, the hardware security module 400 and the other hardware security module 402 are equipped with a communication interface by means of which they perform the authentication and with which the hardware security module 400 requests the execution of one or more instructions by the other hardware security module 402. To request an instruction, for example, the hardware security module 400 sends a specification of the instruction to the other hardware security module 402 and any data required to execute the instruction (such as an encrypted text and a key). The hardware security module 400 can copy its configuration (i.e. configuration data) to the other hardware security module 402 (or more descriptively, clone itself). The configuration data can contain data (e.g. keys) required to execute the instruction.

In the following text, various embodiments are specified.

Embodiment 1 is a hardware security module as shown in FIG. 4.

Embodiment 2 is the hardware security module according to embodiment 1, wherein the control device is designed to configure the other hardware security module for executing the one or more instructions.

Embodiment 3 is the hardware security module according to embodiment 1 or 2, wherein the control device is configured to clone a configuration of the hardware security module onto the other hardware security module in order to process the one or more instructions by means of the other hardware security module.

Embodiment 4 is the hardware security module according to any one of embodiments 1 to 3, wherein the control device is configured to send the one or more instructions to the other hardware security module by means of a peer-to-peer communication link.

Embodiment 5 is the hardware security module according to any one of embodiments 1 to 4, wherein the control device is configured to decide that one or more instructions should be relocated if the instruction load of the hardware security module is above a specified threshold value.

Embodiment 6 is the hardware security module according to embodiment 5, including an instruction queue, wherein the instruction load is the fill level of the instruction queue.

Embodiment 7 is the hardware security module according to any one of embodiments 1 to 6, wherein the control device is configured to allocate the other hardware safety module and is configured to release the other hardware safety module again after processing of the one or more instructions.

Embodiment 8 is the hardware security module according to any one of embodiments 1 to 7, wherein the control device is configured to determine a number of the one or more instructions to be relocated to the other hardware security module, based on the instruction load of the hardware security module.

Embodiment 9 is the hardware security module according to any one of embodiments 1 to 8, wherein the control device is configured to decide that instructions are to be relocated until such time as the instruction load of the hardware security module falls below a specified threshold value.

Embodiment 10 is the hardware security module according to any one of embodiments 1 to 9, including a crypto-unit that is configured to perform cryptographic operations.

Embodiment 11 is the hardware security module according to any one of embodiments 1 to 10, wherein the cryptographic operations each include a decryption, an encryption, a signing operation and/or the verification of a signature.

Embodiment 12 is the hardware security module according to any one of embodiments 1 to 11, wherein the control device is configured to authenticate the other hardware security module based on a signature generated by the other hardware security module.

Embodiment 13 is the hardware security module according to any one of embodiments 1 to 12, wherein the hardware security module and the other hardware security module have separate hardware for performing the cryptographic operations.

According to another embodiment, a hardware security module is provided, having a receiver that is configured to receive instructions for performing cryptographic operations, a detection device that is configured to detect an overload, and a relocation device that is configured to relocate one or more instructions to another hardware security module in the event of an overload.

Although the invention has mainly been shown and described by reference to specific embodiments, it should be understood by those familiar with the technical field that numerous changes can be made with regard to its design and details without departing from the nature and scope of the invention, as defined by the following claims. The scope of the invention is therefore defined by the attached claims and it is intended that any changes that fall within the literal meaning or equivalent scope of the claims are included.

The invention claimed is:

1. A hardware security module, comprising:
a receiver configured to receive one or more instructions to perform cryptographic operations, and a control device configured to:
place the one or more instructions in an instruction queue, the instruction queue having an instruction load, where the instruction load is the fill level of the instruction queue;
monitor the instruction queue, and determine when the instruction load is above a specified threshold value;
based upon the determination that the instruction load is above the specified threshold value, decide that the one or more instructions are to be relocated; identify a second hardware security module for relocating the one or more instructions;
authenticate the second hardware security module; and
request processing of the one or more instructions by the second hardware security module, and relocate the one or more instructions to the second hardware security module.

2. The hardware security module as claimed in claim 1, wherein the control device is configured to configure the second hardware security module for executing the one or more instructions.

3. The hardware security module as claimed in claim 1, wherein the control device is configured to clone a configuration of the hardware security module onto the second hardware security module in order to process the one or more instructions.

4. The hardware security module as claimed in claim 1, wherein the control device is configured to send the one or more instructions to the second hardware security module by a peer-to-peer communication link.

5. The hardware security module as claimed in claim 1, wherein the control device is configured to allocate the second hardware security module to process the one or more instructions and is configured to release the second hardware security module after processing of the one or more instructions.

6. The hardware security module as claimed in claim 1, wherein the control device is configured to determine a number of the one or more instructions to be relocated to the second hardware security module, based on the instruction load of the hardware security module.

7. The hardware security module as claimed in claim 1, wherein the control device is configured to relocate the one or more instructions until the instruction load falls below the specified threshold value.

8. The hardware security module as claimed in claim 1, wherein the control device is configured to authenticate the second hardware security module based on a signature generated by the second hardware security module.

9. The hardware security module as claimed in claim 1, wherein the hardware security module and the second hardware security module have separate hardware for performing cryptographic operations.

10. A method of operating a hardware security module comprising:
    receiving, with a receiver of the hardware security module, one or more instructions to perform cryptographic operations;
    placing, with a control device of the hardware security module, the one or more instructions in an instruction queue, the instruction queue having an instruction load, where the instruction load is the fill level of the instruction queue;
    monitoring, with the control device of the hardware security module, the instruction queue, and determining with the control device of the hardware security module that the
    instruction load is above a specified threshold value;
    based upon the determination that the instruction load is above the specified threshold value, deciding, with the control device of the hardware security module, that the one or more instructions are to be relocated;
    identifying, with the control device of the hardware security module, a second hardware security module for relocating the one or more instructions;
    authenticating, with the control device of the hardware security module, the second hardware security module; and
    requesting, with the control device of the hardware security module, the second hardware security module process the one or more instructions and relocating the one or more instructions to the second hardware security module.

11. The method of claim 10 further comprising:
    communicating with the second hardware security module, by the control device of the hardware security module, by dividing at least one communication into different, independent sessions according to a secret-sharing principle.

12. The method of claim 11 further comprising:
    detecting, with the control device of the hardware security module, a forced opening of a housing of the hardware security module; and
    deleting, with the control device of the hardware security module, all security-relevant information stored by the hardware security module, including cryptographic keys.

13. The method of claim 12 further comprising:
    outputting, with the control device of the hardware security module, a result of processing the one or more of the instructions and a status that indicates that an error occurred, wherein the exact error details are not output.

14. The method of claim 13 further comprising:
    protecting keys stored in a crypto-unit with at least one hardware-based protective measure; and
    sending, with the control device of the hardware security module, in response to
    compromising of the crypto-unit, a message to a configurable receiver over one of a network, a mobile network, a telephone network, and a satellite for external monitoring of the hardware security module.

15. The method of claim 14 further comprising:
    fetching, with the control device of the hardware security module, the one or more of the instructions from the instruction queue, wherein the instruction queue is not stored on a secure hardware area of the hardware security module.

16. The method of claim 14 further comprising:
    storing, with the control device of the hardware security module, the one or more of the instructions redundantly on copies of the instruction queue maintained by the hardware security module and at least the second hardware security module.

17. The method of claim 16 wherein said authenticating further comprises:
    authenticating, with the control device of the hardware security module, the second hardware security module such that the second hardware security module discloses no information regarding a computer system that currently occupies the second hardware security module.

* * * * *